Inventors
HARCOURT C. SONTAG
SAMUEL H. J. WOMACK
FIDEL CORDERO

By
Attorney

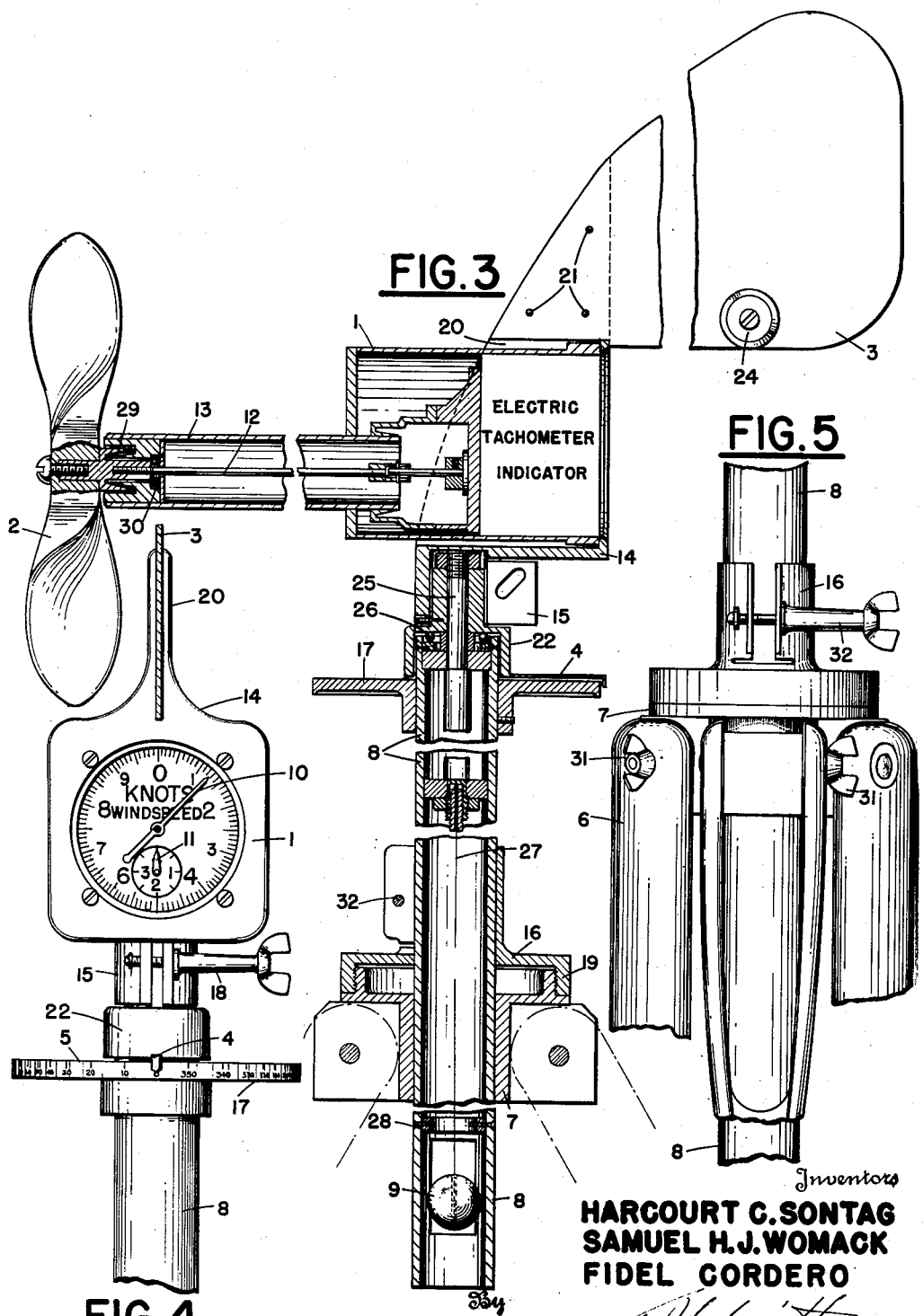

Patented Sept. 2, 1952

2,608,859

UNITED STATES PATENT OFFICE 2,608,859

PROPELLER ANEMOMETER

Harcourt C. Sontag, Arlington, Va., Fidel Cordero, Washington, D. C., and Samuel H. J. Womack, Bethesda, Md.

Application February 6, 1948, Serial No. 6,574

3 Claims. (Cl. 73—189)

(Granted under the act of March 3, 1883, as amended April 30, 1928; 370 O. G. 757)

This invention relates to means for determining wind speed and direction, and more particularly to a portable instrument for accurately indicating the direction and speed of movement of air.

The object of this invention is to provide a self-contained and complete instrument that may be quickly set up at any point to indicate continuously and accurately the flow or movement of air with respect to speed and direction.

Another object is to construct a propeller type wind speed and direction indicator with a tripod support having quick level adjusting means thereon.

Another object is to construct the above indicator by mounting a propeller on the shaft of an electric tachometer indicator and setting this combination horizontally in a frame provided with a directional vane and balanced on a vertical pivot.

Another object is to calibrate the above tachometer indicator with an appropriate propeller to read in .1 knot increments from 0 to 35 knots.

Another object is to provide the above tachometer indicator with alternate propellers with selected characteristics for other speed ranges, and curve charts for each propeller to interpret the corresponding tachometer readings.

Another object is to provide dust and rain proof seals for the propeller shaft and tachometer bearings.

Another object is to provide a direction indicator by having a horizontal compass scale rotatably adjustable on said tripod support and a cooperating pointer mounted on said vertical pivot.

Another object is to make the tripod support and the vertical pivot readily separable, to provide the device in two parts for easy transportation in two convenient packages.

Other and more specific objects will appear in the following detailed description of a preferred form of the invention, having reference to the accompanying drawings, wherein:

Fig. 3 is a detail elevational sectional view of the device, partly broken away;

Fig. 4 is a front view of the speed and direction indicator means of the device; and Fig. 5 is a partial elevational view of the upper end of the tripod support and clamping means for adjusting the height of the vertical pivot support and levelling tube.

The instrument is of the portable type designed for measuring the speed and direction of the wind, particularly for use on aircraft landing fields.

The wind speed or the component of the wind speed parallel to a particular landing strip is easily determined by entering a calibration chart with the reading of the instrument. The instrument is self-contained, requiring for operation no power either mechanical or electrical, except that taken from the wind for turning a vane and rotating a small propeller. The indicator 1 (a modified electric tachometer indicator) operates on the magnetic drag principle and is responsive to wind speeds as low as about one knot.

Figure 1:
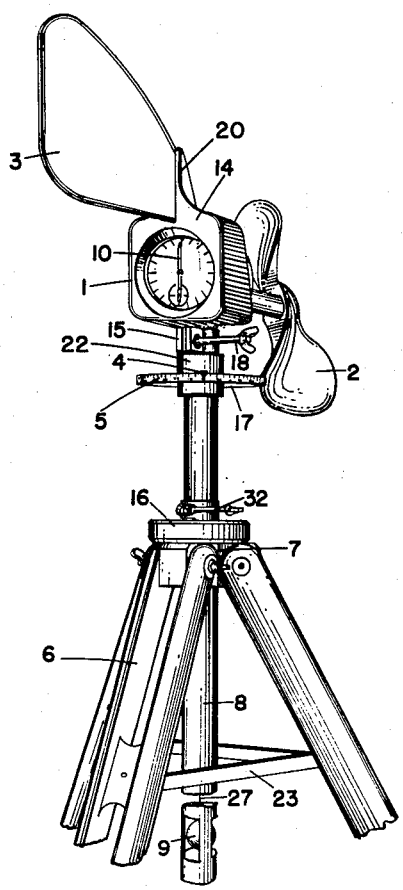
Fig. 1 is a perspective view of the device showing the legs of the tripod broken off in the interest of saving space.

The instrument consists of four principal parts: an anemometer, a wind direction indicator, a tripod support, and a leveling device, all shown in Fig. 1. Details of the construction are essentially as given in the drawings. The anemometer is a propeller 2 coupled directly to the meter 1. The wind direction indicator consists of a vane 3 which operates a pointer 4 indicating on a graduated circle 5. These parts are mounted upon the upper end of a vertically disposed tubular post 8 the lower portion of which encloses a plumb bob 9 for leveling the instrument. The tubular post, hereafter referred to simply as tube 8, is supported in its vertical position by a suitable fitting on the shoulder piece 7 of a tripod 6.

The meter 1 of the anemometer is a modfied indicator of a Kollsman Navy Mark V electric tachometer which has a standard 2¾-inch dial and a long and a short pointer, 10 and 11 respectively, indicating on separate scales, as shown in Fig. 4. The long pointer 10 moves three and one-half revolutions through an indicated range of from zero to thirty-five knots (originally 0–3500 R. P. M.), or 10 knots per revolution, while the short pointer 11 indicating on the inset scale moves ⅞ of a revolution for the same range. The scale for the long pointer is evenly graduated in divisions of 0.1 knot and the scale for the small pointer is evenly divided into divisions of 5 knots (originally 500 R. P. M.). The modification of the meter other than the altering of the scale consisted in removing the rotor and stator of the three-phase synchronous motor and substituting the propeller-driven shaft 12 enclosed in a housing tube 13. The meter 1 is slidably mounted in a horizontally extending recess in cast bracket 14 integral with which is bracket clamp 15 located on the bottom of said bracket. The meter 1 normally mounted in bracket 14 rotates in azimuth at a level which is adjustable from 5½ feet to 6½ feet from the ground, for the convenience of the operator. This adjustment for height is made by using the base clamp 16.

The wind direction indicator consists of a dural vane 3, a pointer 4, and a disc 17, shown in Figs. 1, 3 and 4. The vane is attached to a split extension 20 of the bracket 14 above the indicator by means of screws 21, and the pointer 4, which extends parallel to the vane 3, is attached to the rim of an adaptor cap 22 rotatably mounted upon the upper end of tube 8 and shaped to fit into bracket clamp 15. Thus, by tightening clamp 15 the bracket 14 is rotatably mounted upon tube 8 and vane 3 attached to said bracket is maintained in fixed angular relation to the pointer 4. The scale 5 for the pointer is on the disc 17, which is fixedly secured to the tube 8 below the adaptor cap 22. This disc 17 is graduated on the rim in degrees (0-360) and on the top side N-E-S-W, as in a compass. The washer 24, Fig. 3, is used as a balancing weight. The adaptor cap 22 is free to rotate with respect to the disc 17, being internally supported by a shaft 25 held by ball bearings 26 in the tube 8, to which the disc 17 is attached. The vane deflects with the wind and hence heads the propeller directly into the wind.

The tube 8, to which the anemometer and the wind direction indicator are attached, is detachable in one unit from the base clamp 16, Fig. 1, by loosening the thumb screw 32 and lifting the assembly. It follows that disc 17 will rest upon and may be rotated with respect to the base clamp 16 when the thumb screw 32 is loose.

The support is a surveyor's tripod 6 with 5-foot legs and shoulder piece 7. The shoulder piece 7 was modified to receive the base clamp 16 with its threaded downward extending flange 19 and the leveling tube 8. A woven strap 23 is used to join the legs to prevent excessive spread and the inadvertent collapse of the tripod on a smooth surface.

The axis of the leveling tube 8 normally extends vertically downward from and perpendicular to the disc 17 when the bob 9 (a metal ball) is suspended without touching the sides of the tube. The ball 9 is pendulous. During transit the ball is restrained from moving longitudinally, except for a short distance, by the supporting wire 27 and by a partition 28 located as shown in Fig. 3, in the tube 8. These parts together with the tube sides form a cage for the bob, preventing loss of or damage to the ball and wire during ordinary handling.

As indicated above, the instrument may be easily removed from the tripod and separated into three parts comprising the propeller-indicator unit, the vane-bracket unit, and the compass disc-leveling tube unit. Normally the propeller-indicator unit and the vane-bracket unit form one assembly, and the compass disc-leveling tube unit and the base clamp-tripod unit form a second assembly. The two assemblies are separated by loosening bracket clamp 15 and fit into individual carrying cases.

Figure 2:
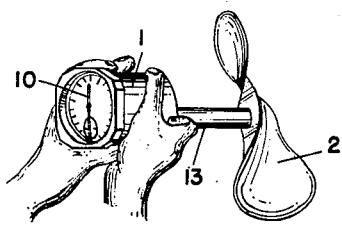
Fig. 2 is a view of the tachometer indicator with the propeller, removed from the device and held by hand in operating position, for roughly determining wind speed components in any direction.

The propeller-indicator unit may be held in the hands, preferably overhead, and read as shown in Fig. 2 to determine the approximate component of the speed of the wind in any chosen direction.

*Propeller characteristics.*—The maximum range of the instrument may be varied by using propellers of various rotational-speed-airspeed characteristics and by changing the closeness of coupling of the magnet and the follower cup. The nominal 35 knot range of the modified scale corresponded initially to an actual motor shaft speed of 3500 R. P. M. By a slight readjustment of the coupling, the sensitivity was increased to a point where approximately 2860 R. P. M. gave a reading of 35 knots. For the instrument to read on the present dial directly in knots at the higher speeds, a propeller having an effective characteristic of 2860/35 or approximately 82 R. P. M./knot is required. For the instrument to have a maximum range of 17.5 knots (each major scale unit in the upper range is equivalent to ½ knot), it follows that a propeller having a characteristic of 164 R. P. M./knot is required.

A rainproof and dust-proof seal 29 is provided at the outer bearing 30 of the propeller shaft housing 13.

*To set up*

1. Select a location for the instrument out in the open away from interfering structures, preferably on level ground for convenience in setting up the tripod.

2. To set up the tripod, loosen the three wing nuts 31 which clamp the legs, spread the legs apart about as far as the straps 23 will permit, and then, holding the leveling tube 8 approximately vertical, retighten the wing nuts 31 slightly to take up the principal looseness. For wind speeds above approximately 25 knots the legs should be weighted down or anchored by spikes.

3. Carefully remove the indicator, vane and propeller assembly from its packing case, first loosening the thumb screw 18.

4. Set the clamp 15 over the adaptor part of the tripod assembly and tighten the thumb screw 18. Then check, and readjust if necessary, the level of the assembled instrument. This may be done conveniently by peering at the position of the plumb bob through the upper slots in the legs and moving the legs one at a time either in or out or deeper into the earth as required. When the plumb bob is floating approximately in the center of the casing, securely tighten the leg wing nuts. The position of the bob should be checked occasionally to determine that the instrument has remained level.

*To align disc to indicate true direction of wind*

1. With the graduated disc 17 free to rotate by loosening the thumb screw 32 on base clamp 16, turn the vane until the direction reading is 0(360) degrees, or to the heading of any landmark. Holding this alignment, rotate the unit to head north or line up with the chosen landmark.

A pocket compass may be effectively used in this procedure, particularly if the setting is 0°. When used it should be placed near the rim of the disc, close to the pointer. In this case, the vane unit and disc are rotated as a unit while reading 0 until the compass reading, corrected for variation, indicates north, when the observer is facing north, with the anemometer in front of him. The procedure of making this initial setting must be checked to be sure that the direction from which the wind blows is indicated.

2. After aligning the disc, elevate it to a convenient reading level, recheck alignment and tighten the loose thumb screw snugly. The wind vane now will indicate the true direction of the wind to the accuracy of the original alignment.

To align disc to indicate wind direction relative to a runway

1. With the graduated disc free to rotate (the locking thumb screw 32 being loose), bring the pointer to 0(360) degrees reading and hold it at this indication by hand. Then rotate disc and vane as a unit until the vane (N-S axis) lines up with the direction of the landing strip. In setting up the instrument, the wind should come from a direction in front of the observer when he faces the instrument. This latter requirement is only for convenience so that the component angle will be between 0–90 and 360–270 degrees. If the wind direction should change so that a reading of between 90 and 270 degrees is obtained, the graduated disc can be rotated exactly 180 degrees so that a reading of less than 90 degrees away from 0(360) is again obtained.

2. After the alignment, elevate the disc to a convenient height, recheck alignment, and tighten the loose thumb nut snugly.

Operation

1. The instrument when set up as indicated above should begin to operate on an increasing wind speed as low as 1.5 knots, and after starting continue to indicate down to approximately 0.5 knot, and up as high as the maximum range of the particular propeller used. To measure speeds below the starting point of the propeller, start the propeller by hand and note the equilibrium reading. Low speeds thus measured may have a directional error due to failure of the vane to line up with the direction of the wind.

2. In reading the indicators, directly face the speed indicator dial and direction indicator pointer, moving with the vane to keep in position and approaching no nearer than necessary to read the scales. The indicator requires no tapping. With the propeller not turning, the indicator pointer will read only approximately zero (0±0.1). This may be taken into account in the calibration.

3. For the actual wind speed, or component along a runway, reference may be had to calibration charts which may be prepared for the particular propeller used with the instrument.

To find the value of the horizontal component of the wind along the landing strip note also the angular reading on the graduated disc, if the instrument is oriented with respect to the landing strip, or otherwise determine the angle, then consult the charts.

Obvious modifications in the form and arrangement of the several parts of this instrument may be made without departing from the spirit and scope of this invention, as defined in the appended claims.

This invention may be manufactured or used by or for the Government of the United States of America for governmental purposes without the payment of any royalties thereon or therefor.

What is claimed is:

1. A portable anemometer comprising a tripod having a vertical tubular post mounted thereon, an adaptor cap rotatably mounted on the upper end of said post, a bracket detachably mounted on said cap and including a horizontal hollow portion, a vertical vane fixed to and extending from said hollow portion, a wind velocity measuring unit slidably and removably mounted in said hollow portion, said unit including a propeller shaft extending horizontally opposite said vane and a propeller mounted on the outer end thereof.

2. A device as described in claim 1, and in addition, a wind direction indicating means comprising a pointer fixedly secured to and extending outwardly from the edge of said adaptor cap and a calibrated disc fixedly secured to said tubular post immediately below said adaptor cap.

3. A device as described in claim 1, including in addition, a leveling means permanently incorporated within said vertical tubular post and automatically operable to continuously indicate when the tubular post is in the true vertical position necessary for proper operation of the wind velocity measuring unit.

HARCOURT C. SONTAG.
FIDEL CORDERO.
SAMUEL H. J. WOMACK.

REFERENCES CITED

The following references are of record in the file of this patent:

UNITED STATES PATENTS

| Number | Name | Date |
|---|---|---|
| 315,261 | Edwards | Apr. 7, 1885 |
| 839,005 | Lafon | Dec. 18, 1906 |
| 1,436,575 | Colt | Nov. 21, 1922 |
| 2,191,955 | Chappell et al. | Feb. 7, 1940 |

FOREIGN PATENTS

| Number | Country | Date |
|---|---|---|
| 9,726 | Great Britain | of 1912 |
| 330,808 | Italy | Oct. 24, 1935 |